(12) United States Patent
Ehrich et al.

(10) Patent No.: US 9,614,889 B2
(45) Date of Patent: *Apr. 4, 2017

(54) AUTONOMIC CONTENT LOAD BALANCING

(75) Inventors: Nathanael F. Ehrich, Raleigh, NC (US); Niraj P. Joshi, Cary, NC (US); Kimberly D. Kenna, Cary, NC (US); Robert C. Leah, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 982 days.

This patent is subject to a terminal disclaimer.

(21) Appl. No.: 12/773,274

(22) Filed: May 4, 2010

(65) Prior Publication Data

US 2010/0218107 A1 Aug. 26, 2010

Related U.S. Application Data (63) Continuation of application No. 12/276,051, filed on Nov. 21, 2008, now Pat. No. 7,761,534, which is a continuation of application No. 10/674,759, filed on Sep. 30, 2003, now Pat. No. 7,502,834.

(51) Int. Cl.
 *G06F 3/048* (2013.01)
 *H04L 29/08* (2006.01)
(52) U.S. Cl.
 CPC .......... *H04L 67/02* (2013.01); *H04L 67/1002* (2013.01); *H04L 67/1014* (2013.01)

(58) Field of Classification Search
 CPC .. H04L 67/02; H04L 67/1014; H04L 67/1002
 See application file for complete search history.

(56) References Cited

U.S. PATENT DOCUMENTS

| | | | |
|---|---|---|---|
| 5,649,200 | A | 7/1997 | Leblang et al. |
| 5,655,130 | A | 8/1997 | Dodge et al. |
| 5,887,133 | A | 3/1999 | Brown et al. |
| 5,911,145 | A | 6/1999 | Arora et al. |
| 5,999,912 | A | 12/1999 | Wodarz et al. |
| 6,014,694 | A | 1/2000 | Aharoni et al. |
| 6,023,714 | A | 2/2000 | Hill et al. |
| 6,028,603 | A | 2/2000 | Wang et al. |

(Continued)

OTHER PUBLICATIONS

Smith, et al. "Scalable Multimedia Delivery for Pervasive Computing", ACM, 1999, pp. 131-140.

(Continued)

*Primary Examiner* — Abdullahi E Salad
(74) *Attorney, Agent, or Firm* — Marcia L. Doubet (57) ABSTRACT

Techniques are disclosed for providing autonomic content load balancing. A programmatic selection is made from among alternative content versions based upon current conditions. Preferably, the alternative selectable versions specify content to be used in a Web page, and a version is selected responsive to receiving a request for the Web page. The selectable version may comprise the Web page, or a component of a Web page may have selectable versions. Optionally, the Web page may include more than one component with dynamically-selectable content. In this case, the versions may be selectable independently of one another.

17 Claims, 7 Drawing Sheets

(56) References Cited

U.S. PATENT DOCUMENTS

| | | | |
|---|---|---|---|
| 6,097,389 A | 8/2000 | Morris et al. | |
| 6,119,136 A | 9/2000 | Takata et al. | |
| 6,144,996 A * | 11/2000 | Starnes et al. | 709/217 |
| 6,226,001 B1 | 5/2001 | Bardon et al. | |
| 6,226,642 B1 | 5/2001 | Beranek et al. | |
| 6,243,761 B1 * | 6/2001 | Mogul et al. | 709/246 |
| 6,256,037 B1 | 7/2001 | Callahan | |
| 6,278,462 B1 | 8/2001 | Weil et al. | |
| 6,300,947 B1 | 10/2001 | Kanevsky | |
| 6,317,795 B1 | 11/2001 | Malkin et al. | |
| 6,345,279 B1 | 2/2002 | Li et al. | |
| 6,457,030 B1 | 9/2002 | Adams et al. | |
| 6,463,440 B1 | 10/2002 | Hind et al. | |
| 6,493,734 B1 | 12/2002 | Sachs et al. | |
| 6,526,426 B1 | 2/2003 | Lakritz | |
| 6,606,544 B2 | 8/2003 | Glenn et al. | |
| 6,708,309 B1 | 3/2004 | Blumberg | |
| 6,732,142 B1 | 5/2004 | Bates et al. | |
| 6,842,768 B1 | 1/2005 | Shaffer et al. | |
| 6,857,102 B1 | 2/2005 | Bickmore et al. | |
| 6,938,077 B2 | 8/2005 | Sanders | |
| 6,966,034 B2 | 11/2005 | Narin | |
| 6,983,331 B1 | 1/2006 | Mitchell et al. | |
| 7,159,182 B2 * | 1/2007 | Narin | 715/744 |
| 7,191,400 B1 | 3/2007 | Buvac et al. | |
| 7,213,079 B2 | 5/2007 | Narin | |
| 7,308,649 B2 | 12/2007 | Ehrich et al. | |
| 7,343,555 B2 * | 3/2008 | Ko et al. | 709/201 |
| 7,502,834 B2 | 3/2009 | Ehrich et al. | |
| 7,543,223 B2 * | 6/2009 | Rodriquez et al. | 715/200 |
| 7,673,026 B2 * | 3/2010 | Jardin et al. | 709/223 |
| 7,761,534 B2 | 7/2010 | Ehrich et al. | |
| 2001/0044809 A1 | 11/2001 | Parasnis et al. | |
| 2002/0082910 A1 | 6/2002 | Kontogouris | |
| 2002/0083132 A1 * | 6/2002 | Holland et al. | 709/203 |
| 2002/0091755 A1 | 7/2002 | Narin | |
| 2002/0099829 A1 | 7/2002 | Richards et al. | |
| 2002/0124020 A1 | 9/2002 | Janakiraman et al. | |
| 2002/0124076 A1 * | 9/2002 | Lindstrom-Tamer | 709/224 |
| 2002/0124182 A1 | 9/2002 | Bacso et al. | |
| 2002/0169818 A1 | 11/2002 | Stewart et al. | |
| 2002/0178254 A1 | 11/2002 | Brittenham et al. | |
| 2003/0018668 A1 * | 1/2003 | Britton et al. | 707/513 |
| 2003/0167334 A1 | 9/2003 | Butler | |
| 2005/0071745 A1 | 3/2005 | Ehrich et al. | |
| 2005/0071757 A1 | 3/2005 | Ehrich et al. | |
| 2005/0071758 A1 | 3/2005 | Ehrich et al. | |
| 2005/0120075 A1 | 6/2005 | Aasman et al. | |
| 2009/0070464 A1 | 3/2009 | Ehrich et al. | |

OTHER PUBLICATIONS

Lemay, et al. "Laura Lemay's Web Workshop JavaScript", Sams. net, 1996, Chapter 1, pp. 18-19.

Lemay, et al. "Laura Lemay's Web Workshop JavaScript", Sams. net, 1996, Chapters 10-11.

Lemay, et al. "Laura Lemay's Web Workshop JavaScript", Sams. net, 1996, pp. 227-231.

The Automated Design and Code Writing System, Information on the use of Computer Program Flowchart and LogicCoder, May 2002, pp. 1-14, Logic Code Generator, London, United Kingdom, <http://logiccoder.com/AboutFlowCharting.htm>.

Ehrich et al. U.S. Appl. No. 10/674,759, filed Sep. 30, 2003, Office Action, May 11, 2007, 11 pages.

Ehrich et al. U.S. Appl. No. 10/674,759, filed Sep. 30, 2003, Office Action, Nov. 2, 2007, 10 pages.

Ehrich et al. U.S. Appl. No. 10/674,759, filed Sep. 30, 2003, Advisory Action, Jan. 15, 2008, 3 pages.

Ehrich et al. U.S. Appl. No. 10/674,759, filed Sep. 30, 2003, Office Action, May 30, 2008, 12 pages.

Ehrich et al. U.S. Appl. No. 10/674,759, filed Sep. 30, 2003, Examiner Interview Summary, Jun. 25, 2008, 2 pages.

Ehrich et al. U.S. Appl. No. 10/674,759, filed Sep. 30, 2003, Notice of Allowance, Oct. 29, 2008, 5 pages.

Ehrich et al. U.S. Appl. No. 10/674,769, filed Sep. 30, 2003, Office Action, Dec. 14, 2005, 16 pages.

Ehrich et al. U.S. Appl. No. 10/674,769, filed Sep. 30, 2003, Office Action, Apr. 20, 2006, 18 pages.

Ehrich et al. U.S. Appl. No. 10/674,769, filed Sep. 30, 2003, Office Action, May 7, 2007, 18 pages.

Ehrich et al. U.S. Appl. No. 10/674,769, filed Sep. 30, 2003, Examiner Interview Summary, May 29, 2007, 2 pages.

Ehrich et al. U.S. Appl. No. 10/674,769, filed Sep. 30, 2003, Notice of Allowance, Aug. 8, 2007, 6 pages.

Ehrich et al. U.S. Appl. No. 10/675,418, filed Sep. 30, 2003, Office Action, Nov. 1, 2015, 14 pages.

Ehrich et al. U.S. Appl. No. 10/675,418, filed Sep. 30, 2003, Office Action, Apr. 18, 2006, 14 pages.

Ehrich et al. U.S. Appl. No. 10/675,418, filed Sep. 30, 2003, Office Action, Nov. 20, 2006, 11 pages.

Enrich et al. U.S. Appl. No. 10/675,418, filed Sep. 30, 2003, Office Action, May 14, 2007, 14 pages.

Ehrich et al. U.S. Appl. No. 10/675,418, filed Sep. 30, 2003, Examiner Interview Summary, Jun. 4, 2007, 5 pages.

Ehrich et al. U.S. Appl. No. 10/675,418, filed Sep. 30, 2003, Office Action, Aug. 22, 2007, 8 pages.

Ehrich et al. U.S. Appl. No. 10/675,418, filed Sep. 30, 2003, Office Action, Jan. 18, 2008, 9 pages.

Ehrich et al. U.S. Appl. No. 10/675,418, filed Sep. 30, 2003, Office Action, Jun. 4, 2008, 9 pages.

Ehrich et al. U.S. Appl. No. 10/675,418, filed Sep. 30, 2003, Office Action, Nov. 13, 2008, 10 pages.

Ehrich et al. U.S. Appl. No. 10/675,418, filed Sep. 30, 2003, Office Action, May 4, 2009, 14 pages.

Ehrich et al. U.S. Appl. No. 10/675,418, filed Sep. 30, 2003, Notice of Abandonment, Jan. 28, 2010, 2 pages.

Ehrich et al. U.S. Appl. No. 12/276,051, filed Nov. 21, 2008, Notice of Allowance, Mar. 9, 2010, 7 pages.

Ehrich et al. U.S. Appl. No. 12/276,051, filed Nov. 21, 2008, Supplemental Notice of Allowance, Apr. 5, 2010, 4 pages.

* cited by examiner

FIG. 1

| | 110 | 120 |
|---|---|---|
| 130 | Page1.html | componentA, componentB |
| 140 | Page2.html | componentA, componentX, componentY |
| 150 | Page3.html | componentZ |

| componentA 210 | deviceType, networkTraffic 220 | | |
|---|---|---|---|
| | lightTraffic | mediumTraffic | heavyTraffic |
| PDA | compA-PDA-light 231 | compA-PDA-med | compA-PDA-heavy |
| cellPhone | compA-cell-light | compA-cell-med 241 | compA-cell-heavy |
| workstation | compA-wkst-light | compA-wkst-med | compA-wkst-heavy |
| portable | compA-port-light | compA-port-med | compA-port-heavy |
| other | compA-other-light | compA-other-med | compA-other-heavy |

```
<HTML>
<TITLE>Web page with selectable content</TITLE>
<BODY>
310 <VariableContent id="ComponentA">
320 <condition id="cond1" name="deviceType" />
330 <condition id="cond2" name="networkTraffic" />
    </VariableContent>
340 <VariableContent id="ComponentB">
350 <condition id="cond1" name="numberServers" />
360 <condition id="cond2" name="numberActiveUsers" />
370 <condition id="cond3" name="serverLoad" />
    </VariableContent>
    :
380 <...  placeholder for ComponentA version ... >
    :
390 <...  placeholder for ComponentB version ... >
    :
</BODY>
</HTML>
```

```
<HTML>
<TITLE>Web page with selectable content</TITLE>
<BODY>
...
510 <!-- ComponentA selection -->
    <... src="http://www.ibm.com/compA-PDA-light" ... >
...
520 <!-- ComponentB selection -->
    <... src="http://www.ibm.com/compB-manyServers-manyUsers-heavyLoad" ... >
...
</BODY>
</HTML>
```

```
<HTML>
<TITLE>Web page with selectable content</TITLE>
<BODY>
...
560 <!-- ComponentA selection -->
    <... src="http://www.ibm.com/compA-cell-med" ... >
...
570 <!-- ComponentB selection -->
    <... src="http://www.ibm.com/compB-manyServers-manyUsers-medLoad" ... >
...
</BODY>
</HTML>
```

| 610 | 620 |
|---|---|
| PageA.html | availableBandwidth |
| PageB.html | availableBandwidth, numberActiveUsers |
| PageC.html | averageRoundTripTime |

- MPEG *710*
  - livenews.mpeg *711*
- JPEG *720*
  - IMG1.jpg *721*
  - IMG2.jpg *722*
  - IMG3.jpg *723*
- TEXT *730*
  - description.txt *731*

FIG. 8

AUTONOMIC CONTENT LOAD BALANCING

RELATED INVENTIONS

The present invention is related to commonly-assigned U.S. patent application Ser. No. 10/674,769 (now U.S. Pat. No. 7,308,649), titled "Providing Scalable, Alternative Component-Level Views", and application Ser. No. 10/675,418, titled "Client-Side Processing of Alternative Component-Level Views". These related applications (referred to herein as "the first related invention" and "the second related invention", respectively) were filed on Sep. 30, 2003 and are hereby incorporated herein by reference.

BACKGROUND OF THE INVENTION

Field of the Invention

The present invention relates to client/server computing, and deals more particularly with techniques for providing autonomic content load balancing by dynamically selecting from among a plurality of scalable, alternative versions of content, based on run-time conditions, when preparing content for delivery to a target (such as a client workstation).

Description of the Related Art

The popularity of client/server computing has increased tremendously in recent years, due in large part to growing business and consumer use of the public Internet and the subset thereof known as the "World Wide Web" (or simply "Web"). Other types of client/server computing environments, such as corporate intranets and extranets, are also increasingly popular. As solutions providers focus on delivering improved Web-based computing, many of the solutions which are developed are adaptable to other client/server computing environments. Thus, references herein to the Internet and Web are for purposes of illustration and not of limitation. (Furthermore, the terms "Internet", "Web", and "World Wide Web" are used interchangeably herein.)

Millions of people use the Internet on a daily basis, whether for their personal enjoyment or for business purposes or both. As consumers of electronic information and business services, people now have easy access to sources on a global level. When a human user is the content requester, delays or inefficiencies in returning responses may have a very negative impact on user satisfaction, even causing the users to switch to alternative sources. Delivering requested content quickly and efficiently is therefore critical to user satisfaction. Furthermore, delivering content to end users in a timely manner may be required to meet contractual obligations.

Most modern computing applications render their displayable output using a graphical user interface, or "GUI". In a client/server computing environment such as the Internet, client software known as a "browser" is typically responsible for requesting content from a server application and for rendering the information sent by the server in response. Commonly, the displayed information is formatted as a Web page, where the layout of the Web page is defined using a markup language such as Hypertext Markup Language ("HTML").

Designing a Web site to serve the needs of a varied audience is a complex undertaking. A Web page providing stock quotes, for example, may be of interest to end users whose computing devices range from cellular phones and other handheld devices with limited display space to powerful desktop workstations with a relatively large amount of display space. A Web page designer may choose to focus the page layout toward the capabilities of the higher-end computing devices, in order to improve the viewing experience of that subset of the potential users. This may result in a Web page that is difficult or impossible to use from a lower-end or constrained device.

Similarly, designing a Web site that operates well under varied network conditions may be challenging. Web pages containing rich multimedia content, for example, may provide an enjoyable viewing experience for users of full-function computing devices that are connected to servers over high-speed network connections. On the other hand, if users of limited-function devices access these same pages, or if the pages are accessed using low-speed connections or during periods of network congestion, the end user may be quite displeased.

Techniques are known in the art that consider factors such as current network conditions, capabilities of the client device, and preferences of the end user when preparing content to be delivered from a server. Commonly-assigned U.S. Pat. No. 6,138,156, titled "Selecting and Applying Content-Reducing Filters Based on Dynamic Environmental Factors", discloses techniques with which environmental factors can be used to dynamically filter the content being delivered from a server to a user's workstation. The environmental factors include characteristics of the target device, such as its available storage capacity, and billing information related to the user's account with his connection service provider. These factors are used with a rule-based approach to select a transcoding filter to be applied to a document before delivering it to a requesting user. If the end user's device has limited available storage, for example, then a color image to be rendered on a Web page might be transcoded to gray-scale, or even completely omitted, before sending content to this device.

Commonly-assigned U.S. Pat. No. 6,681,380 (Ser. No. 09/504,209, filed Feb. 15, 2000), which is titled "Aggregating Constraints and/or Preferences Using an Inference Engine and Enhanced Scripting Language", teaches techniques for aggregating constraints and/or preferences using an inference engine and an enhanced scripting language. Values of multiple factors and the interrelationships between the factors and their values are aggregated, and the result is used to tailor or direct the processing of a software program. A rule-based system is disclosed therein for aggregating information, and based on the aggregated result, one or more transformations are performed on a requested document before transmitting it to the requester. The particular transformations to be performed may be tailored to constraints such as one or more of: the capabilities of the client device; the connection type over which the content will be delivered; the network bandwidth of the connection; the type of user agent operating on the client device; preferences of a particular user; preferences set by a systems administrator or other such person (or preferences generated in an automated manner); preferences for a particular application executing in a particular domain; etc. According to preferred embodiments of this commonly-assigned invention, the aggregated result is made available to an application program, which will use the result to tailor its own processing. This technique avoids having to change the software process itself as new values and/or new factors are deemed to be important to the aggregation result.

Commonly-assigned U.S. patent application Ser. No. 09/442,015, filed Nov. 17, 1999 (now abandoned), which is titled "Context-Sensitive Data Delivery Using Active Filtering", discloses techniques for providing context-sensitive data delivery using active filtering to tailor the delivered data content. Preferably, a server maintains information about the typical device types to which it serves data, and continually pre-filters available data for delivery to these devices. Style sheets are used to perform one or more device-specific filtering transformations. When delivering content to a particular device, the server receives a device certificate from the device, and uses this information to identify the device type and the device's user. A user's stored preferences and/or access privileges can then be determined, and this information can be used to refine or filter information available from the server. In particular, this invention discloses filtering information to account for one or more of: an identification of a user of the device; privileges (also referred to conversely as limitations) and/or preferences of the user; the location, device type, and/or device capabilities of the user's device; and the current time.

In another prior art approach, Web sites may implement a choice of two content views, one providing high graphic content and the other providing low graphic content, thereby providing alternative views. Sometimes, the end user is given the choice of which view he wants to see (e.g., by having a graphical button on the Web page that can be clicked to select one content type or the other). Or, using a prior art "<IMG>" (image) tag in a Web page, the content designer can specify that the type of content (either an image file or a substituted text message) to be delivered to the client can be selected using factors such as device type or server load. However, this approach generally provides a binary decision, whereby a selection is limited to two choices.

What is needed are techniques that enable selecting from among a varying number of versions of content in an automated manner, thereby providing autonomic content load balancing.

SUMMARY OF THE INVENTION

An object of the present invention is to provide techniques for selecting from among a varying number of versions of content in an automated manner.

Another object of the present invention is to provide autonomic content load balancing by selecting among alternative content versions based upon current conditions.

Still another object of the present invention is to provide techniques for programmatically selecting a particular alternative version of content, under different conditions, when preparing a content response.

Another object of the present invention is to provide techniques where a content version is programmatically selected from among versions that have been identified (e.g., by Web page designers) as being preferable under different conditions.

Yet another object of the present invention is to provide techniques whereby content selection decisions are made dynamically, from among two or more alternative content versions, based on associations of the versions with conditions under which a particular alternative version should be selected.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides methods, systems, and computer program products. In one aspect, the present invention provides techniques for providing autonomic content load balancing, comprising: defining, in a server-side data structure for a Web page to be served, that the Web page has a plurality of alternative versions defined and at least one condition for selecting a particular one of the alternative versions, each of the alternative versions having associated therewith at least one value of each of the at least one condition; receiving, at a server from a client, a request for the Web page; upon determining, by the server from the server-side data structure, that at least one condition is defined for selecting a particular one of the alternative versions of the requested Web page and that the plurality of alternative versions are defined for the requested Web page, selecting a particular one of the defined alternative versions to be used as the requested Web page when responding to the received request; and serving the selected alternative version of the Web page, from the server to the client, as the requested Web page when responding to the received request. In this aspect, the server-side data structure comprises a directory structure corresponding to files stored on the server; a directory in the directory structure is associated with the Web page; and each of the alternative versions corresponds to a distinct entry in the directory, and the determining further comprises: determining, by the server from the server-side data structure using information that is distinct from information provided by the request, each of the at least one condition defined for selecting the particular one of the alternative versions and then determining, for each of the determined at least one condition, a current value thereof; and selecting, by the server as the particular one of each of the determined at least one condition matches one of the at least one value associated with the condition for the particular one, comprising identifying which of the distinct entries in the directory to serve as the selected alternative version of the Web page.

In another aspect, the present invention provides techniques for using dynamically selectable content, comprising: defining, in a server-side data structure for each of at least two portions of a Web page to be served, that each of the at least two portions has a plurality of alternative selectable versions defined for each of the portions and at least one portion-specific condition for selecting a particular one of the alternative selectable versions, each of the alternative selectable versions having associated therewith at least one value of each of the at least one portion-specific condition; receiving, at a server from a client, a request for the Web page; upon determining, by the server from the server-side data structure, that at least one portion-specific condition is defined for selecting a particular one of the alternative selectable versions of at least two portions of the requested Web page and determining that the plurality of alternative selectable versions are defined for the at least two portions by detecting that syntax defining the requested Web page contains a syntax element, for each of the at least two portions, which indicates that the plurality of alternative selectable versions are defined for the portion; and serving the requested Web page, from the server to the client, with the selected specific one of each of the at least two portions used therein, when responding to the received request. In this aspect, the determining further comprises: determining, by the server from the server-side data structure using information that is distinct from information provided in the request, each of the at least one portion-specific condition defined for selecting each of the at least two portions and then determining, for each of the determined at least one portion-specific conditions, a current value thereof; and selecting, by the server for each of the at least two portions, a specific one of the alternative selectable versions to be used in the portion of the requested Web page when responding to the received request, wherein the determined current value of each of the determined at least one portion-specific condition matches one of the at least one value associated with the portion-specific condition for the selected specific one.

The present invention will now be described with reference to the following drawings, in which like reference numbers denote the same element throughout.

DESCRIPTION OF PREFERRED EMBODIMENTS

The present invention provides novel techniques for providing autonomic content load balancing by selecting among alternative content versions based upon current conditions. Information technology ("IT") professionals (such as content designers or Web page designers) provide alternative content versions that are designed for use under different conditions, and specify the condition(s) associated with each version. When a Web page is requested that includes (or references) content for which multiple versions have been provided, a particular alternative version is programmatically selected (according to applicable conditions) when preparing a response for delivery to a target. (Preferred embodiments are described with reference to content encoded as Web pages and targets that are requesting client workstations, although this is by way of illustration and not of limitation.)

According to preferred embodiments of the present invention, a content designer provides multiple versions of content that will form part of a rendered Web page and classifies the versions as to the condition(s) under which each version should be selected. The actual content of the Web page will then vary dynamically at run time, depending on the associated conditions and, as a result of those conditions, which version of the content is selected for delivery. The alternative content versions may comprise different versions of a particular Web page. Alternatively, the content of a Web page may be allowed to vary at the level of individual components of the overall Web page, in which case multiple versions of one or more components are provided by a content designer, and those component versions are classified as to the condition(s) under which each version should be selected. Optionally, more than one such component within a single Web page may vary simultaneously. (In this case, the components may be selected independently of one another, i.e., based upon values of independent conditions. Or, a particular condition may impact more than one selection.)

Figure 1:
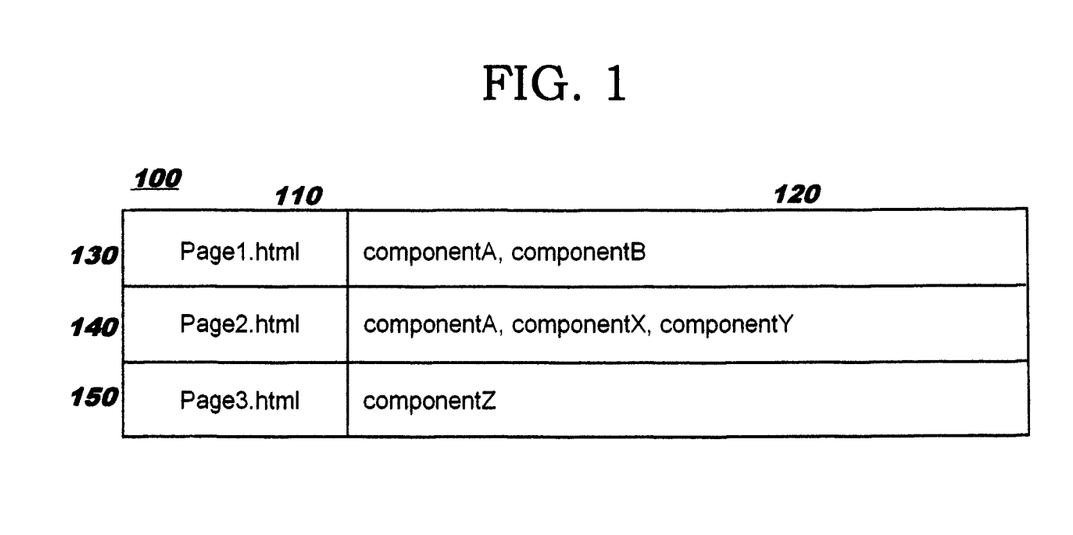
FIG. 1 provides a sample table providing information about each Web page that has content with selectable versions, according to preferred embodiments of the present invention.
Figure 2:
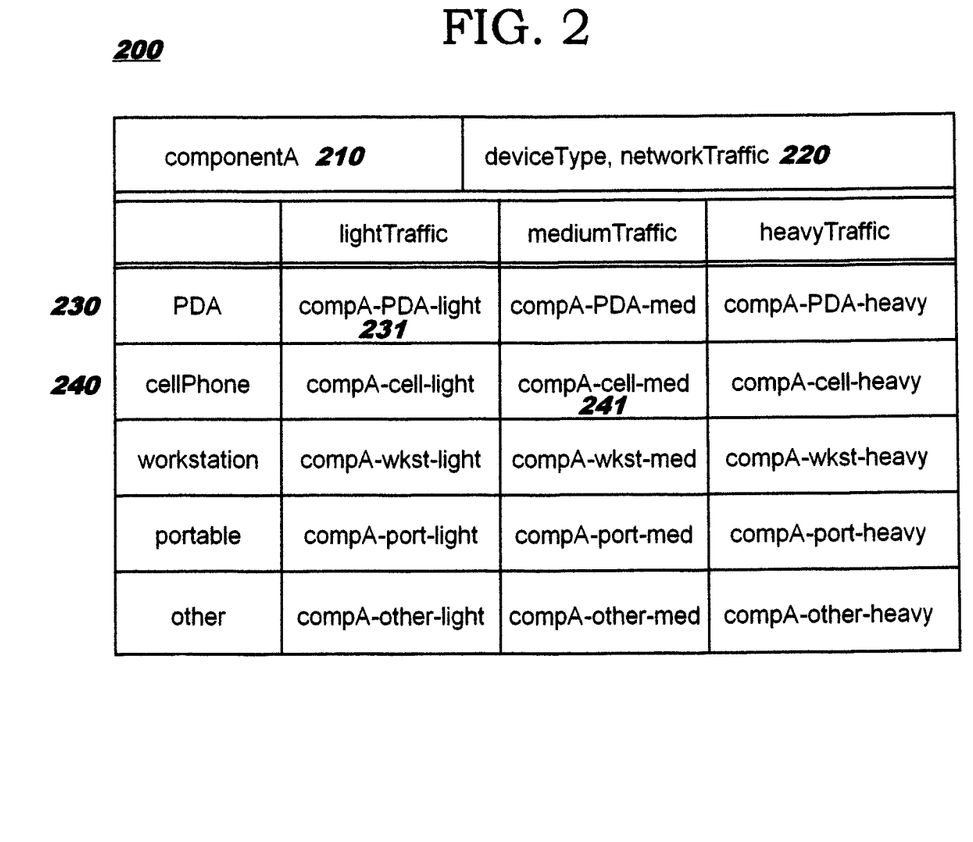
FIG. 2 shows a sample table that may be created for each content item that has selectable versions, identifying each version and the condition(s) under which that version should be selected, according to preferred embodiments of the present invention.
Figure 3:
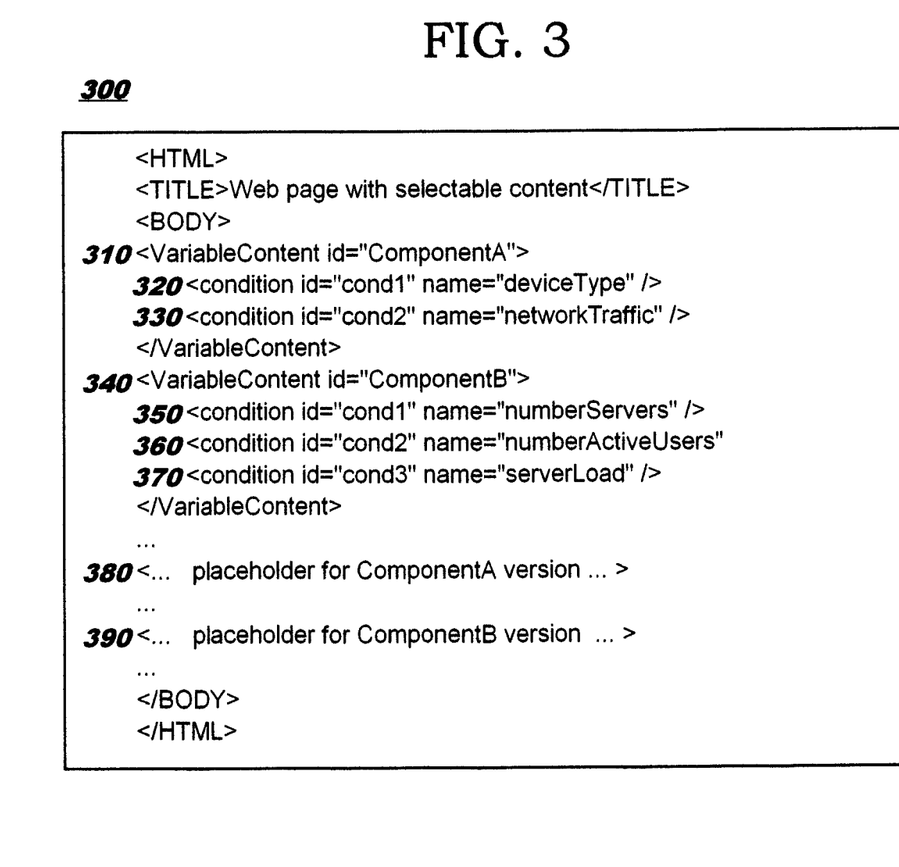
FIG. 3 provides a sample Web page that is used to illustrate one manner in which a portion of the information used when selecting among versions may be specified.

Preferred embodiments are described herein with reference to "selectable versions" or "selectable content versions", and an implementation of the present invention may provide this dynamic selection approach at the level of an entire Web page or at the level of components of a Web page, or both. FIGS. 1-3, described below, primarily illustrate techniques for providing selectable content within a Web page, and FIGS. 6-7 primarily illustrate techniques for providing selectable content at the level of an entire Web page.

Preferred embodiments of the present invention operate primarily at a server, responsive to receiving a content request. Applicable factors or conditions are monitored, preferably by an agent which provides information to the server (as discussed below with reference to FIG. 4), and this information is used in the selection process as the server creates a response for delivery to the requester. A Web page having dynamically-selected content is then returned in a response message to the requester. Conditions considered by preferred embodiments may include (by way of illustration) one or more of the following types of external stimuli: (1) number of active users; (2) available bandwidth; (3); average request/response round-trip time; (4) processing capacity on server(s); and (5) number of available servers.

For example, suppose that a request for a Web page having selectable content versions is received and the current conditions monitored for an implementation of the present invention include current processing load on selected Web servers and currently available bandwidth. If values of these conditions exceed some threshold value (where the threshold value has been determined as indicating a heavy processing load and severe network congestion), then a version which is less rich (and which is therefore less compute-intensive and which requires less bandwidth for transmission) is preferably selected for use in the response, providing an autonomic "scaling down" of delivered content. When network and processor congestion eases, on the other hand, then a richer version may be selected, providing a "scaling up" of delivered content.

Preferred embodiments of the present invention may optionally be used in combination with either or both of the first and second related inventions. Preferred embodiments of these related inventions leverage information specified using an "ALTlet" construct, which is a syntax element that may be encoded in a markup language or scripting language. The markup language may be HTML or another markup language such as Extensible Markup Language ("XML"), Wireless Markup Language ("WML"), Extensible Hypertext Markup Language ("XHTML"), and so forth. The scripting language may be, by way of illustration, the JavaScript® language. ("JavaScript" is a registered trademark of Sun Microsystems, Inc. in the United States, other countries, or both.)

The first related invention defines server-side processing techniques, whereby one or more components (which are specified in server-side ALTlets of a source document such as a Web page template) are programmatically selected at the server for delivery to a requesting client, according to preferred embodiments, based on run-time factors such as: (1) device type used by the requester; (2) bandwidth limitations, if any; (3) subscription level of the requester; and (4) other types of system/network factors such as processor capacity or current network load. For example, if a company markets a Web page service for delivery of current traffic conditions that uses a variable-level subscription business model (e.g., whereby several different levels of content are available at varying subscription rates), the server-side techniques of the first related invention enable delivering a view of traffic ranging from a simple text description to live video feed, based on the subscription level. Refer to the first related invention for more information on these server-side techniques. Using server-side ALTlets, as described therein, allows a Web page designer to specify (directly within a template of the Web page) which alternative component-level view(s) should be used when the server creates a Web page for delivery to a requester.

The second related invention defines client-side processing techniques, whereby one or more components of a Web page received at a requesting client may be dynamically varied when the Web page is rendered, based on run-time factors such as a varying amount of display "real estate" that is available for rendering the Web page. For example, if the end user resizes a window in which the Web page is displayed, components of the Web page may be dynamically altered in response. Refer to the second related invention for more information on these client-side techniques. Using ALTlets, as described therein, allows a Web page designer to specify which alternative component-level view(s) should be used under dynamically-varying client-side conditions.

Returning to discussion of the server-side techniques of the present invention, the manner in which preferred embodiments provide autonomic load balancing by selecting among alternative content versions, based upon current conditions, will now be described in more detail with reference to FIGS. 1-8.

FIGS. 1-3 provide illustrations used herein to describe dynamic selection of component-level content versions for inclusion within a Web page. FIG. 1 provides a sample table 100 that provides information about each Web page that has content with selectable versions. In the example, column 110 indicates that Web pages having Uniform Resource Locators ("URLs") "Page1.html", "Page2.html", and "Page3.html" each have content with selectable versions. Column 120 of table 100 identifies, for each of these Web pages, the content within that Web page that has the selectable versions. In the example, row 130 therefore indicates that selectable versions of content identified as "componentA" and "componentB" are defined for use in "Page1.html". Similarly, row 140 indicates that selectable versions of content identified as "componentA", "componentX", and "componentY" are defined for use in "Page2.html", and row 150 indicates that selectable versions of content identified as "componentZ" are defined for use in "Page3.html".

Typically, it will be advantageous for autonomic load balancing purposes to provide versions of particular content that vary by media type. During congested conditions, those media types that consume less processor resources, less bandwidth, and/or less storage (or that meet other conditions, as appropriate for a particular implementation of the present invention) may then be selected. For example, rather than delivering current traffic report information to end users as full-motion video, another media type such as still images might be used to convey relatively-recent snapshots of traffic conditions. In contrast, during lightly loaded conditions, media types providing a richer experience for the end user (but requiring more resources) can be selected for delivery.

FIG. 2 shows a sample table 200 that may be used by an implementation of the present invention for a content item that has selectable versions. (A data structure of this type may also be useful for representing information providing dynamic selection of page-level content versions, which is discussed in more detail below with reference to FIGS. 6-7.) Table 200 provides a "2-dimensional" approach, where various values reflecting two conditions 220 are specified, along with the version of this particular content (which is identified at 210 as "componentA") which is to be selected when the conditions have those values. The column headings and row headings in FIG. 2, in this example, identify the values of the two conditions. (Referring back to rows 130 and 140 of FIG. 1, it can be seen that "componentA" is identified as being used in Web pages with URLs "Page1.html" and "Page2.html".)

For purposes of this example, the monitored conditions are the type of device used by the content requester and network traffic. This is represented in table 200 at reference number 220. Five different potential devices type values are specified in the row headings as "PDA", "cellPhone", "workstation", "portable", and "other". Three different potential values of the network traffic conditions are identified in the column headings as "lightTraffic", "mediumTraffic", and "heavyTraffic". (Embodiments of the present invention may use conditions which are dynamic in nature, such as network traffic level, as well as those which are static, such as end-user device type.)

Tabular representations of sample information are used herein merely for purposes of illustration, and these representations should not be construed as limiting the present invention. A number of different types of data structures may be used as alternatives to tables, such as lists, linked lists, arrays or tuples of information, and so forth. The information represented in FIG. 2, for example, might be persisted using tuples of two forms. In a first form, a tuple such as "(componentA, deviceType, networkTraffic)" may be used to record the information shown at reference numbers 210 and 220 of FIG. 2. In this tuple, the content identifier is specified first, followed by an identifier of each condition that affects the version selection for that content. In a second form, a set of tuples may be used to represent the information stored in the cells of table 200. For example, cell 231 might be specified in tuple form as "(PDA, lightTraffic, compA-PDA-light)" and cell 241 might be specified as "(cellPhone, mediumTraffic, compA-cell-med)". In other words, some number of condition values (corresponding to the conditions identified for this content in a tuple of the "first form") may be specified first, and following those values, an identification of the version corresponding to those values is then specified. In the first of these example tuples, the value "(PDA, lightTraffic, compA-PDA-light)" indicates that when the end-user device type is represented with the value "PDA" and network traffic is represented with the value "lightTraffic", then the name of the content version to be selected is "compA-PDA-light".

When the selectable versions represent different media types, then the versions may be (for example) a textual content version when the system exceeds one threshold indicating severe congestion or processing load, a static image when that threshold is not reached but another threshold indicating some lower level of congestion or system load is reached, and a moving image if neither of these thresholds is reached (e.g., because the congestion or loading is relatively minimal). Refer to the discussion of FIGS. 4 and 8, below, for more information on how current conditions are evaluated and how those evaluations result in selecting different content versions.

Referring now to FIG. 3, rather than specifying the information illustrated in FIGS. 1 and 2 in an external data structure of some form, this information (or a portion thereof) might be specified directly within the affected Web pages, without deviating from the scope of the present invention. Meta tags may be used for this purpose, or specially-denoted comments (having a form such as "<!--VariableContent: id=" . . . " conditions="cond1, cond2, . . . "-->") may be parsed by an implementation of the present invention to locate information pertaining to a Web page's variable-version content. Or, syntax extensions may be defined for this purpose. This syntax extension approach is illustrated by the sample Web page 300 in FIG. 3. In this example, a "<VariableContent>" element is specified for each component of the page that has selectable versions. See reference numbers 310 and 340, which use this syntax to identify "componentA" and "componentB" as having selectable versions. Within these <VariableContent> elements, FIG. 3 illustrates use of child "<condition>" elements to specify the conditions that affect the version selection for this particular content component. Thus, reference numbers 320 and 330 denote syntax specifying the information that was presented at 220 in FIG. 2, and reference numbers 350, 360, 370 specify three different conditions that are used in this hypothetical example to select a version of "componentB". Reference numbers 380 and 390 indicate, generally, that syntax within Web page 300 then specifies where the dynamically-selected version of each selectable content component should be placed in the resulting Web page.

In another alternative, the information specified at reference number 220 of FIG. 2 (i.e., identification of the conditions used to select a version of this content) may be specified in a data structure such as table 100 of FIG. 1, along with the corresponding content identifier. For example, column 120 of row 130 might specify tuples of the form "(componentA, deviceType, networkTraffic)" and "(componentB, numberServers, numberActiveUsers, serverLoad)". Other techniques for representing information described herein for selecting among versions may be used as well, and those other techniques are deemed to be within the scope of the present invention.

Figure 4:
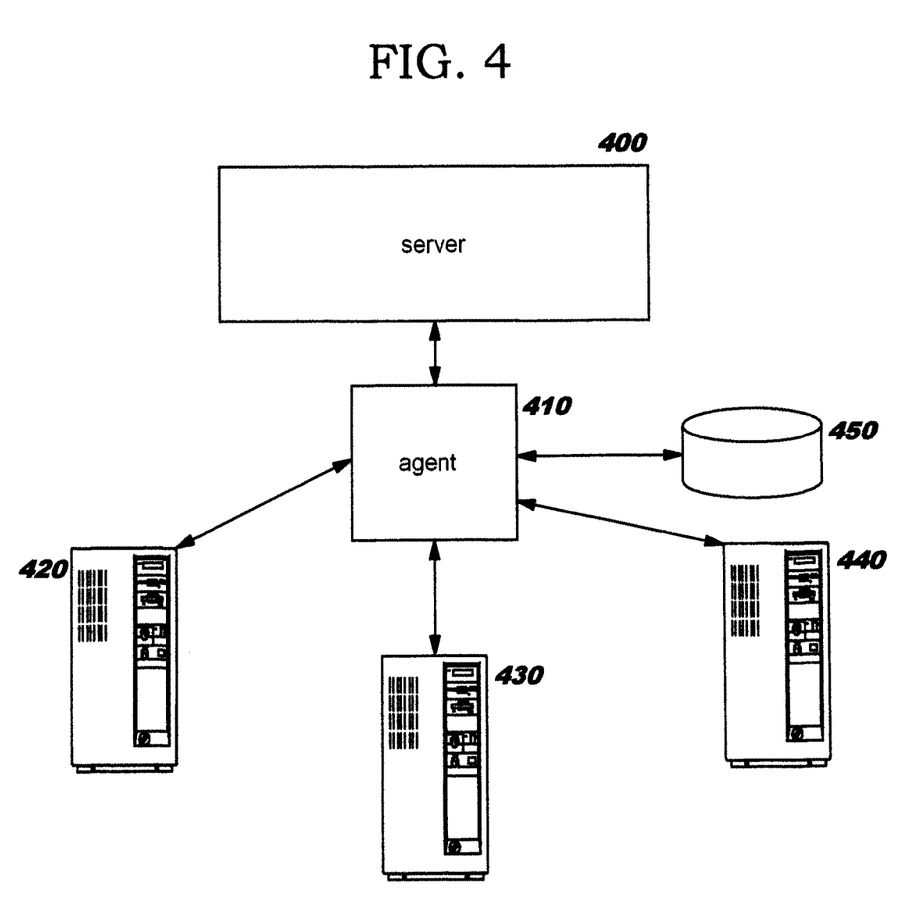
FIG. 4 illustrates use of an agent that monitors a system, at run time, to observe current values of various conditions that may influence selection among content versions.

Referring now to FIG. 4, several representative elements of a system/network environment in which the present invention may operate are illustrated. A server 400, at which Web page requests are received, uses information pertaining to current conditions when selecting content versions for use in response messages. Preferably, server 400 leverages an agent 410 which is adapted for periodically measuring values of current conditions and reporting that information back to server 400. In the example, agent 410 is illustrated as measuring current conditions at three processing devices 420, 430, 440 and one storage device 450. As will be obvious, these devices are provided by way of illustration and not of limitation. Agent 410 may be adapted for monitoring a wide variety of devices and for collecting a wide variety of information.

Agent technology is well known in the art, and the manner in which agent 410 determines which devices to monitor, and obtains measurement data from the monitored devices, does not form part of the present invention. In one approach to determining which devices to monitor, agent 410 may be adapted for consulting a repository in which the present conditions of interest are specified. For example, a configuration file may identify those conditions that are to be monitored by a particular implementation. In another approach, a scan may be performed to gather information from data structures such as that shown in FIG. 2, in order to retrieve the identifiers illustrated at reference number 220 therein, thereby determining which conditions are of interest for the agent.

Preferably, agent 410 forwards information to server 400 in response to queries from server 400 (as discussed with reference to Block 850 of FIG. 8, below). For example, when processing Web page 300 of FIG. 3, server 400 might send a message to agent 410 asking for current values of the five conditions specified at reference numbers 320, 330, 350, 360, and 370. Agent 410 might return a value such as "cellPhone" as its response to the "deviceType" condition 320 (or perhaps a tuple such as "deviceType, cellPhone"), and a value such as "lightTraffic" as its response to the "networkTraffic" condition 330. In that case, server 400 can use those values to access table 200 (or to access an alternative data structure or to otherwise determine the selectable version associated with those two values), thereby retrieving the identification of the content version that is to be selected under these conditions.

Instead of operating responsive to queries from server 400, agent 410 may provide information to server 400 through alternative communication techniques (such as asynchronous message exchange or shared storage).

The techniques illustrated in FIG. 4 may be leveraged by an implementation of the present invention which provides component-level version selection, page-level version selection, or both.

Figure 5A:
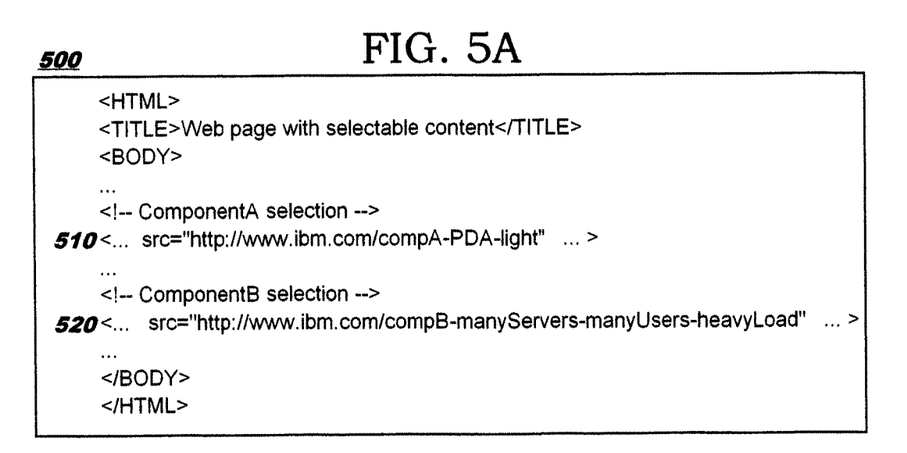
FIGS. 5A and 5B provide HTML syntax showing sample response documents created by a server after programmatically selecting a version of content within a particular Web page, using techniques disclosed herein.
Figure 5B:
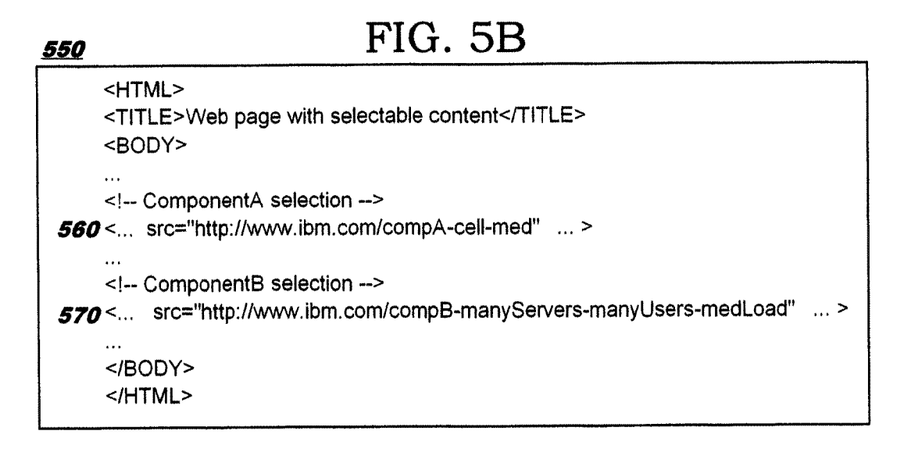

FIGS. 5A and 5B provide HTML syntax showing sample response documents 500, 550 created by a server after programmatically selecting a version of component-level content within a particular Web page, using techniques disclosed herein. In these examples, current conditions have been evaluated to select a version of "componentA" as illustrated at reference numbers 510 and 560, and a version of "componentB" as illustrated at reference numbers 520 and 570. The syntax shown in FIGS. 5A and 5B is intended to illustrate the content selection result, and is not intended to represent actual syntax that might be selected. For example, the version of "componentB" is selected based on factors including how many servers are currently active, and how heavy the current server processing load is. It may therefore be useful to dynamically select from among several target content servers when creating the URL value illustrated at 520 and 570, although this has not been illustrated in the examples.

Figure 6:
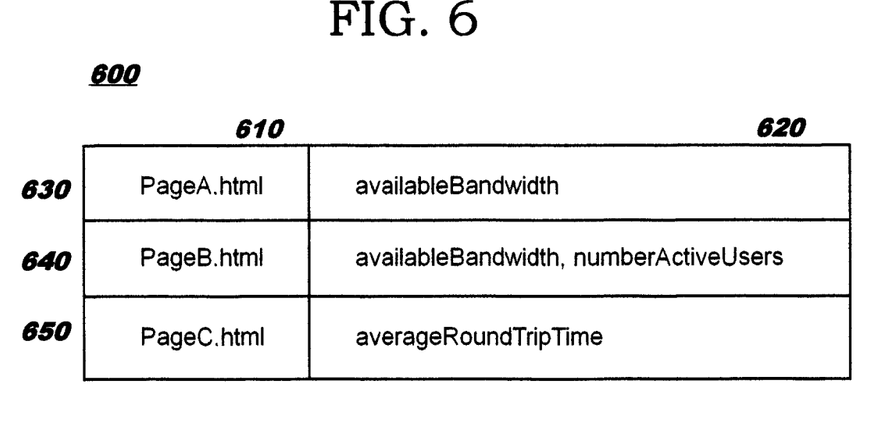
FIG. 6 provides a sample table with information about each Web page that has selectable page-level versions, according to preferred embodiments.

FIG. 6 provides a sample table 600 with information about each Web page that has selectable page-level versions. A data structure of this type may be used advantageously by an implementation of the present invention to identify one or more conditions that influence the selection of a version of a particular Web page. In this example, a first column 610 is used to specify a Web page identifier, and a second column 620 specifies identifiers of the condition(s) associated with each Web page. Selection of content versions forming Web pages identified as "PageA.html" 630, "PageB.html" 640, and "PageC.html" 650 is represented as being influenced by available bandwidth (for "PageA.html"), available bandwidth and also the number of active users (for "PageB.html"), and the average round trip response time (for "PageC.html"). This information may be used in selection logic such as that described below with reference to FIG. 8.

Figure 7:
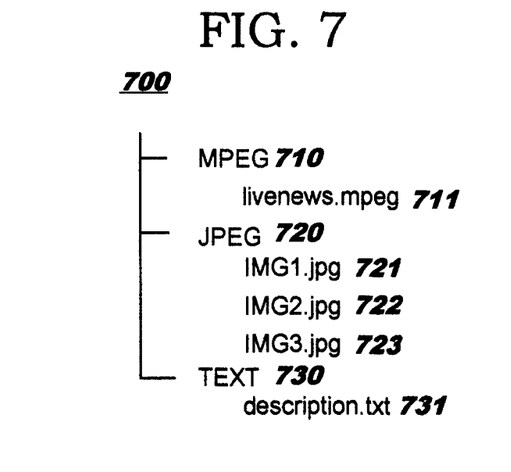
FIG. 7 illustrates a directory structure that may be used with the sample table in FIG. 6.

FIG. 7 illustrates a directory structure that may be used with the sample table in FIG. 6 in order to provide dynamic selection of page-level content versions. Different content versions that are to be selected under different conditions may be stored in different paths (i.e., different sub-directories) within this directory structure. Suppose, for example, that "PageA.html" is the URL for a current news story and that the content designer has specified that a version of this Web page is to be selected according to the currently-available bandwidth (as indicated in row 630 of FIG. 6). If a high-bandwidth connection to the requester is available, for example, then the document returned to this requester might contain a live video feed provided as an "mpeg" file. Accordingly, the "livenews.mpeg" content 711, stored within "MPEG" directory 710, may be selected. Or, if a medium-bandwidth connection is available, then the content to be returned may comprise a series of descriptive pictures that may be viewed sequentially, as a type of slide show. In this case, the "jpeg" image files 721, 722, 723 stored in "JPEG" directory 720 may be selected. On the other hand, if only a low-bandwidth connection is available, a description of the news story, such as the file "description.txt" 731, which is stored in directory "TEXT" 730, might be selected.

Preferably, the root of the hierarchical directory tree 700 shown in FIG. 7 is associated with the requested Web page, which in this case is "PageA.html". The content designer may use a number of techniques to specify the association between the various sub-directories and the condition(s) under which the content stored in that sub-directory should be selected. For example, a matrix such as that illustrated by table 200 in FIG. 2 might be used. Or, tuples of the type described above may be used to associate values of conditions with sub-directories. Alternative techniques may be used without deviating from the scope of the present invention.

Use of separate sub-directories for storing selectable content versions may be advantageous in many scenarios. For example, network-accessible coverage of a fashion show or sporting event may be adapted to current system/network conditions by providing dynamically selectable versions such as live video feed, still images, and textual descriptions. Or, a selection might be made from among versions of still images having differing image resolutions, and so forth. Many variations of this page-level content version selection approach may be envisaged based on the teachings disclosed herein.

Figure 8:
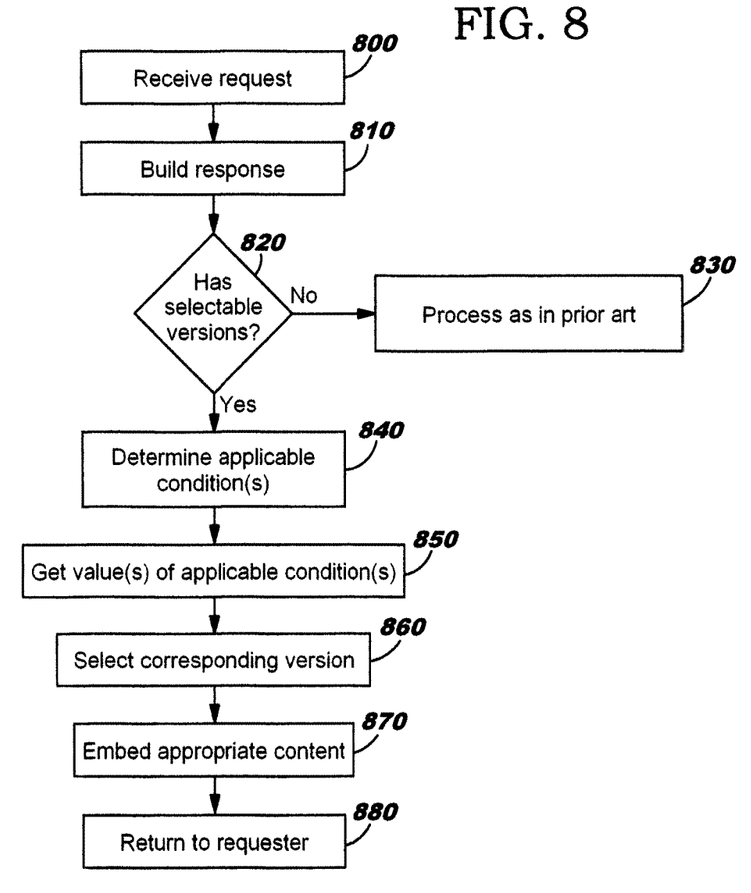
FIG. 8 provides a flowchart depicting logic that may be used to implement preferred embodiments of the present invention.

FIG. 8 provides a flowchart depicting logic that may be used to implement preferred embodiments of the present invention. This logic may be adapted for use with either, or both, the component-level version selection and page-level version selection which have been discussed above. As shown therein, a client request is received (Block 800) by server-side logic, which then proceeds to build a response (Block 810). Block 820 then tests to see if any selectable versions have been defined for content of this response.

For example, when component-level version selection is supported, a table such as that illustrated in FIG. 1 might be consulted, using the URL of the requested page to index or scan through the entries in column 110. Or using the approach illustrated by FIG. 3, a scan of Web page 300 might be performed to determine whether there are any "<VariableContent>" elements encoded therein. In another approach, which has not been illustrated in the examples, a Web page might include a specific element for use in the test of Block 820, such as a "<HasVariableContent>" element which may use an attribute value or element value to specify a yes or no value.

When page-level content version selection is supported, Block 820 preferably comprises determining whether multiple versions of the requested page are available.

In either case, if the requested Web page does not have any content with selectable versions, then normal processing of the prior art is performed (Block 830).

Otherwise, when the test at Block 820 has a positive result, then the applicable conditions are determined (Block 840). For example, a table such as that illustrated in FIG. 2 or FIG. 6 may be consulted to retrieve the values at reference number 220 or 620, respectively. Or, when the approach illustrated by FIG. 3 is used, the processing of Block 840 preferably comprises processing the child "<condition>" elements 320, 330, 350, 360, 370 to retrieve the condition names specified therein. (As will be obvious, element values may be used to specify condition names, rather than the attribute value approach shown in FIG. 3, if desired.)

Once the conditions of interest for this response are identified, Block 850 obtains the current values of those conditions. The server may send a query to an agent which monitors the conditions, and receive a response from that agent. For example, a message might be passed having parameters of "deviceType, networkTraffic" (or identifiers representing those values) when processing "componentA". Or, a message such as "clientABC, availableBandwidth" might be issued to an agent (or other evaluation component) capable of determining the bandwidth of a connection between the server and a hypothetical requesting client or user agent identified as "clientABC". Instead of sending a query message, an agent may periodically submit information pertaining to selected conditions to the server, in which case Block 850 preferably comprises locating the most-recent version of this information and extracting the needed values.

Upon determining the current condition values, a programmatic selection of the corresponding content version is made (Block 860). Code evaluating the applicable conditions preferably returns a value that can be used to access a data structure such as that illustrated by table 200 in FIG. 2 and table 600 in FIG. 6 (or, alternatively, a value that can be mapped to values which have been used in such a data structure). Thus in the "componentA" scenario, the agent might return values of "PDA" and "lightTraffic", in which case Block 860 may use those values to identify cell 231 in FIG. 2. In the "PageA.html" scenario illustrated by FIG. 6, an evaluation component might return "medium" as the currently-available bandwidth value, where this value can then be used to identify the "JPEG" directory 720 of FIG. 7. (That is, a mapping or other association between the "availableBandwidth=medium" condition may be consulted, thereby determining that content stored in the "JPEG" directory should be selected.)

Block 870 then embeds the selected version (or an identifier thereof, such as a URL from which the selected version can be retrieved) into the response document being created. Referring to FIG. 5A, for example, information from cell 231 has been used in the value shown at reference number 510 to illustrate a component-level version selection. Note that for drafting convenience, the examples in FIG. 3 do not provide complete URLs. An implementation of the present invention may be adapted for specifying the selectable version identifiers in their entirety within the data structure illustrated by table 200. Or, an implementation may be adapted for performing syntactical substitutions, such that (for example) the data structure need only specify a varying portion of a content identifier. A response document created using page-level version selection has not been illustrated in the sample Web page response documents, but it will be obvious from discussions herein how such pages may be constructed.

When using component-level version selection, any additional content within the requested Web page for which selectable versions have been defined is preferably processed in an analogous manner to that which has been described for Blocks 820-870 (although this iteration has not been illustrated in FIG. 8). Once content for the entire Web page has been selected, whether using component-level version selection or page-level version selection, the resulting Web page is then returned to the client (Block 880) for rendering (or for other processing to be determined by the client).

Using techniques of the present invention, IT professionals can design a Web page having selectable versions or having selectable versions for various portions thereof, even though multiple versions of that Web page do not need to be manually created. Instead, according to preferred embodiments, the selectable versions are provided and classified according to conditions under which each version is to be selected, as noted above. A programmatic selection can then be made, such that the desired selectable version is "plugged in" at run time.

Several prior art approaches to dynamically selecting Web page content will now be described, in order to contrast prior art approaches with the novel techniques disclosed herein.

As discussed above, in one prior art technique for specifying alternative content versions, the "<IMG>" (image) tag currently supported in HTML provides for a very limited specification of alternative content within a Web page. Using this existing tag, a "src" (source) attribute specifies an address of an image to be rendered in a Web page, and an optional "alt" (alternative) attribute can be used to specify textual content that may be rendered in place of the image. (The client-side decision of which content to render in a particular situation may depend on processing constraints, user preferences, and so forth.) A maximum of two alternatives for the rendered content are possible, and the content types are limited to images and text, when using the existing <IMG> tag. As can be seen from the simple example illustrated by FIGS. 2 and 3 and the example in FIGS. 6 and 7, use of the present invention enables Web page designers to go well beyond the binary choices available using this prior art <IMG> tag, such that widely-varying viewing experiences can be provided for end users.

Portal servers of the prior art may provide for varying display content based on whether a portlet is displayed in its maximized form or in a minimized form. However, this is a static, binary client-side decision, providing only one or the other of two views. This differs from the techniques disclosed herein whereby a server-side selection is made from among a variable number of content versions when creating a Web page.

The present invention also differs from prior art transcoding techniques, whereby one of several different versions of a single source file may be delivered to clients, each version being created by performing a programmatic transformation of a single source file. According to techniques disclosed herein, multiple versions of content are identified at design time, and in preferred embodiments, a selected version is delivered to a client without requiring a programmatic transformation of the selected version itself.

In general, techniques of the present invention may be used to vary the richness of content among a variable number "N" of selectable versions. Autonomic load balancing can then be provided by selecting from among these N versions. This variation among versions may optionally be extended to "M" different components within a particular Web page (as has been noted above), and therefore a single Web page specified by IT professionals is capable of representing M*N different potential viewing experiences for the end user.

Web sites of the prior art that provide rich content, such as Web pages including forms of multi-media streams, may become so congested during times of peak demand that they are rendered functionally inoperative. Following the terrorist attacks on the World Trade Center, for example, news Web sites experienced extremely high traffic volumes. Some Web pages, containing rich media such as high-resolution images and video, required in excess of ten minutes to load on client browsers. In the absence of autonomic content load balancing techniques as disclosed herein, Web site operators may be required to manually disable delivery of such rich media content in order to lessen congestion (which is obviously an undesirable approach).

As has been demonstrated, the present invention provides advantageous techniques for selecting among varying content versions for delivery to a requester. Note, however, that it is not strictly necessary that this content is delivered responsive to a "request". Alternatively, content versions can be selected and distributed using a "push" model, for example by identifying one or more clients who have subscribed for content updates, and then creating content versions for those clients based on external stimuli of the type described above. In addition, it may happen that the dynamic content version selection described herein is performed for reasons other than delivering a Web page to a client. For example, the selection may be performed in order to prepare content for storage (e.g., in a cache). Or, in a non-Web page scenario, techniques disclosed herein may be used to dynamically select content versions for inclusion in a document (such as an XML document or a document encoded in another markup language) to be stored or to be exchanged between devices (which may include peer-to-peer server document transfer).

Techniques of the present invention are not limited to use with selectable content versions of the types explicitly described herein. These techniques are adaptable for use with generally any type of content, examples of which include (by way of illustration but not of limitation) animations, graphics (including scalable vector graphics, or "SVG", images), and so forth.

Techniques disclosed herein may be leveraged to autonomically tune performance of a system/network, as has been discussed. When a network is congested, for example, this information can be used in condition values to dynamically select a less-rich and therefore smaller content version, enabling a response message containing that content version to be transmitted across the network with a lessened impact (as compared to transmitting a larger version) on the existing congestion problem.

Prior art load balancing techniques are primarily directed toward dynamically routing content requests among various candidate servers, based on current system/network load. The autonomic load balancing that is enabled by embodiments of the present invention, on the other hand, is primarily directed toward selecting different content versions using system/network conditions, as has been discussed.

As will be appreciated by one of skill in the art, embodiments of the present invention may be provided as methods, systems, or computer program products. Accordingly, the present invention may take the form of an entirely hardware embodiment, an entirely software embodiment, or an embodiment combining software and hardware aspects. Furthermore, the present invention may take the form of a computer program product which is embodied on one or more computer-readable storage media (including, but not limited to, disk storage, CD-ROM, optical storage, and so forth) having computer-readable program code embodied therein.

The present invention has been described with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, embedded processor, or other programmable data processing apparatus to produce a machine, such that the instructions (which execute via the processor of the computer or other programmable data processing apparatus) create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the functions specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart and/or block diagram block or blocks.

While preferred embodiments of the present invention have been described, additional variations and modifications in those embodiments may occur to those skilled in the art once they learn of the basic inventive concepts. Therefore, it is intended that the appended claims shall be construed to include preferred embodiments and all such variations and modifications as fall within the spirit and scope of the invention.

The invention claimed is:

1. A computer-implemented method of providing autonomic content load balancing, comprising:
defining, in a server-side data structure for a Web page to be served, that the Web page has a plurality of alternative versions defined and at least one condition for selecting a particular one of the alternative versions, each of the alternative versions having associated therewith at least one value of each of the at least one condition, wherein:
the server-side data structure comprises a directory structure corresponding to files stored on the server;
a directory in the directory structure is associated with the Web page; and
each of the alternative versions corresponds to a distinct entry in the directory;
receiving, at a server from a client, a request for the Web page;
upon determining, by the server from the server-side data structure, that at least one condition is defined for selecting a particular one of the alternative versions of the requested Web page and that the plurality of alternative versions are defined for the requested Web page, selecting a particular one of the defined alternative versions to be used as the requested Web page when responding to the received request, comprising:
determining, by the server from the server-side data structure using information that is distinct from information provided in the request, each of the at least one condition defined for selecting the particular one of the alternative versions and then determining, for each of the determined at least one condition, a current value thereof; and
selecting, by the server as the particular one of the alternative versions, the defined alternative version for which the determined current value of each of the determined at least one condition matches one of the at least one value associated with the condition for the particular one, comprising identifying which of the distinct entries in the directory to serve as the selected alternative version of the Web page; and
serving the selected alternative version of the Web page, from the server to the client, as the requested Web page when responding to the received request.

2. The method according to claim 1, wherein the determining, by the server, that the alternative versions are defined comprises detecting that syntax defining the requested Web page contains a syntax element which indicates that the plurality of alternative versions are defined.

3. The method according to claim 1, wherein the determining, by the server, that the alternative versions are defined comprises detecting that an entry in the server-side data structure is associated with the requested Web page, the entry indicating that the plurality of alternative versions are defined.

4. The method according to claim 1, wherein each of the alternative versions comprises the Web page represented using a different media type.

5. The method according to claim 1, wherein existence of the plurality of alternative versions of the Web page is transparent to software executing on the client.

6. The method according to claim 1, wherein the at least one condition defined for the Web page comprises at least one of system conditions and network conditions.

7. The method according to claim 1, wherein:
the Web page comprises at least two different portions;
a plurality of alternative selectable versions and at least one portion-specific condition for selecting a particular one of the alternative selectable versions are defined for each of the at least two different portions, each of the alternative selectable portions having associated therewith at least one value of each of the at least one portion-specific condition, wherein a current value of each portion-specific condition is determinable using server-side information that is distinct from information provided in the request;
upon determining, by the server, that at least one portion-specific condition is defined for selecting a particular one of the alternative selectable versions of the at least two different portions and that the plurality of alternative selectable versions are defined for the at least two different portions, selecting, for each of the at least two different portions, a specific one of the defined alternative selectable versions for which a determined current value of each of the at least one portion-specific condition matches one of the at least one value associated with the portion-specific condition for the specific one; and the serving serves the Web page using, within the selected alternative version of the Web page, the selected specific one for each of the at least two different portions.

8. A computer program product for using dynamically selectable content, the computer program product embodied on one or more non-transitory computer-readable storage media and comprising computer-readable program code for:

defining, in a server-side data structure for each of at least two portions of a Web page to be served, that each of the at least two portions has a plurality of alternative selectable versions defined for each of the portions and at least one portion-specific condition for selecting a particular one of the alternative selectable versions, each of the alternative selectable versions having associated therewith at least one value of each of the at least one portion-specific condition, receiving, at a server from a client, a request for the Web page;

upon determining, by the server from the server-side data structure, that at least one portion-specific condition is defined for selecting a particular one of the alternative selectable versions of at least two portions of the requested Web page and determining that the plurality of alternative selectable versions are defined for the at least two portions by detecting that syntax defining the requested Web page contains a syntax element, for each of the at least two portions, which indicates that the plurality of alternative selectable versions are defined for the portion, performing:

determining, by the server from the server-side data structure using information that is distinct from information provided in the request, each of the at least one portion-specific condition defined for selecting each of the at least two portions and then determining, for each of the determined at least one portion-specific conditions, a current value thereof; and selecting, by the server for each of the at least two portions, a specific one of the alternative selectable versions to be used in the portion of the requested Web page when responding to the received request, wherein the determined current value of each of the determined at least one portion-specific condition matches one of the at least one value associated with the portion-specific condition for the selected specific one;

serving the requested Web page, from the server to the client, with the selected specific one of each of the at least two portions used therein, when responding to the received request.

9. The computer program product according to claim 8, wherein each of the alternative selectable versions for at least one of the at least two portions comprises the portion represented using a different media type.

10. The computer program product according to claim 8, wherein existence of the plurality of alternative selectable versions of each of the at least two portions is transparent to software executing on the client.

11. The computer program product according to claim 8, wherein the at least one portion-specific condition defined for at least one of the at least two portions comprises at least one of system conditions or network conditions.

12. The computer program product according to claim 8, wherein the at least one portion-specific condition defined for at least one of the at least two portions comprises at least one of: a number of active users of the server; processing capacity at the server; or a number of available servers for serving the content.

13. The computer program product according to claim 8, wherein the at least one portion-specific condition defined for at least one of the at least two portions comprises at least one of: available network bandwidth between the client and the server; or average round-trip time for communications between the client and the server.

14. A computer-implemented system for providing autonomic content load balancing, the system comprising a processor and a memory coupled thereto, the memory storing instructions configured to:

receive, at a server from a client, a request for content;

upon determining, by the server by consulting a server-side data structure, that a plurality of alternative versions are defined for the requested content and determining that at least one condition is defined for selecting a particular one of the alternative versions of the requested content by detecting that an entry in the server-side data structure is associated with the requested content, the entry indicating that the plurality of alternative versions are defined, select, by the server, a particular one of the defined alternative versions to be used as the requested content when responding to the received request, comprising:

determining, by the server from the server-side data structure using information that is distinct from information provided in the request, each of the at least one condition for selecting the particular one of the alternative versions and, for each of the determined at least one condition, at least one value thereof which is associated with each of the alternative versions;

determining, by the server using server-side information that is distinct from information provided in the request, a current value of each of the determined at least one condition; and selecting, by the server as the particular one of the alternative versions, the defined alternative version for which the determined current value of each of the determined at least one condition matches one of the at least one value associated with the condition for the particular one; and serve the selected alternative version of the content, from the server to the client, as the requested content when responding to the received request.

15. The system according to claim 14, wherein the instructions configured to determine the current value of each of the determined at least one condition further comprise instructions configured to obtain at least one measurement collected by an automated agent.

16. The system according to claim 14, wherein the instructions configured to determine that the alternative versions are defined further comprise instructions configured to use a network address of the requested content to scan the server-side data structure, the server-side data structure storing information for each content for which alternative versions are defined.

17. The system according to claim 14, wherein the at least one condition comprises at least one of: a number of active users of the server; processing capacity at the server; and a number of available servers for serving the content.

* * * * *